United States Patent [19]

McKibben

[11] 4,072,554

[45] Feb. 7, 1978

[54] HAND PUNCH AND TAPE REINFORCEMENT APPLICATOR

[76] Inventor: John D. McKibben, 324 Cottonwood Court, Schaumburg, Ill. 60172

[21] Appl. No.: 674,045

[22] Filed: Apr. 5, 1976

[51] Int. Cl.$^2$ ........................ B32B 31/00; B26D 7/14; B65M 23/34

[52] U.S. Cl. ...................................... 156/514; 83/176; 83/922; 226/88

[58] Field of Search .................. 156/513, 514; 226/88; 83/176, 922

[56] References Cited

U.S. PATENT DOCUMENTS

| | | | |
|---|---|---|---|
| 2,158,790 | 5/1939 | Arthur | 83/176 |
| 2,228,372 | 1/1941 | Stuhlinger | 83/176 |
| 2,382,406 | 8/1945 | Engberg | 83/176 |
| 3,466,963 | 9/1969 | Palson et al. | 83/922 |
| 3,529,757 | 9/1970 | Sharpe | 226/88 |
| 3,558,254 | 1/1971 | Cahill | 83/922 |

*Primary Examiner*—Douglas J. Drummond
*Attorney, Agent, or Firm*—Sabin C. Bronson

[57] ABSTRACT

A portable paper hole punch and hole reinforcement tape applicator comprising a housing including operating mechanism for feeding a pressure sensitive tape over a sheet of paper. Punch means and a pressure pad are provided for punching a hole through the tape and paper and applying pressure to seal or bond the tape to the paper. Tape feed means are provided and include means for imparting a transverse curl to the tape so that the latter is stiffened lengthwise to prevent bunching or jamming during the hole punching operation.

The surfaces of all parts of the device contacted by the adhesive side of the tape are coated with "Teflon" or other suitable material, so that the tape will not adhere thereto as it is moved thereover.

9 Claims, 9 Drawing Figures

HAND PUNCH AND TAPE REINFORCEMENT APPLICATOR

BACKGROUND AND SUMMARY OF THE INVENTION

The present invention relates to applicators for forming a hole in note book paper or the like and applying a hole reinforcing tape thereabout.

Heretofore, such units have encountered difficulties in effectively punching and applying tape because of jamming and alignment problems. By the present invention it is proposed to provide a device of the character which overcomes the problems encountered heretofore.

This is accomplished generally by portable apparatus including a housing having a paper and tape support ledge, means for supporting a roll of pressure sensitive tape in the housing, a strip of the tape being trained over a tape drive roll and thence over a piece of paper to be punched on the support ledge. A hole punch means is then actuated to pierce the tape and paper while the tape is being pressed and bonded to the paper, and a blade cuts off the end of the tape which is pressed and bonded to the paper.

In accordance with the present invention the drive roller is formed with a peripheral concave groove which is shaped to coact with a circumferential rib received therein to curl the tape in a manner so that it is stiffened lengthwise.

DESCRIPTION OF THE PREFERRED EMBODIMENT

Figure 1:
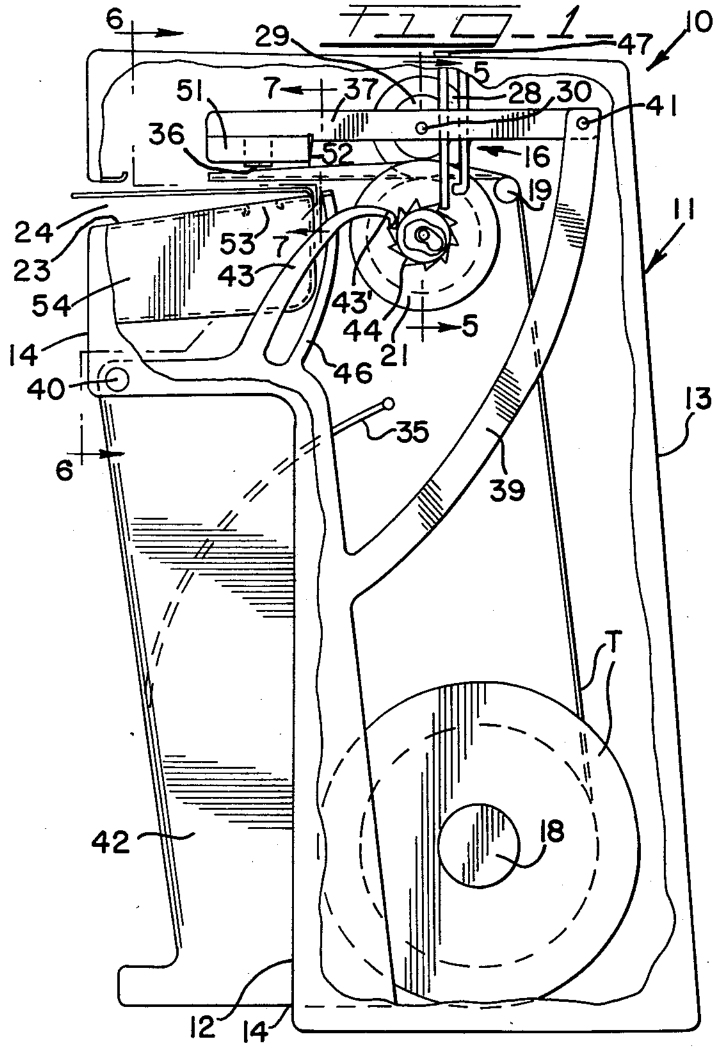
FIG. 1 is a front elevational view of a paper punch and reinforcement applicator embodying the structure of the present invention, with some of the housing being broken away.
Figure 2:
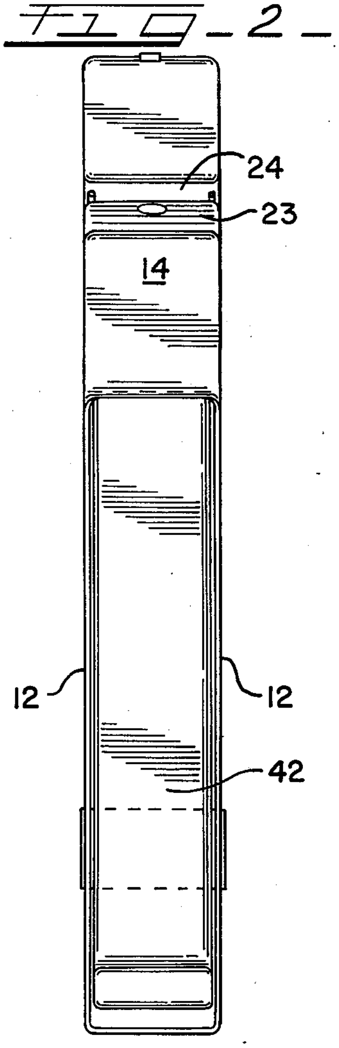
FIG. 2 is an elevational view of the punch and applicator viewed from the left end of FIG. 1.

Referring now to the drawings the paper punch and hole reinforcement applicator 10 of the present invention includes a housing 11, which may be made from a suitable plastic or sheet metal. The housing 11 includes a pair of spaced side walls 12—12, and end wall 13, and a front wall 14.

Disposed within the housing 11 is an operating mechanism 16 for punching a hole in the paper and at the same time applying a reinforcement tape about the punched hole. The operating mechanism 16 includes a supply shaft 18 on which a roll of tape T is rotatably supported. The tape T is preferably of the type having a pressure responsive adhesive on one face thereof.

The tape T is trained over a horizontally disposed guide pin 19 into engagement with a drive roll 21. In the operative position the terminal end of the tape abuts against a stop flange 22 provided on the paper support ledge 23, formed in a paper opening 24 in the front wall 14.

Figure 5:
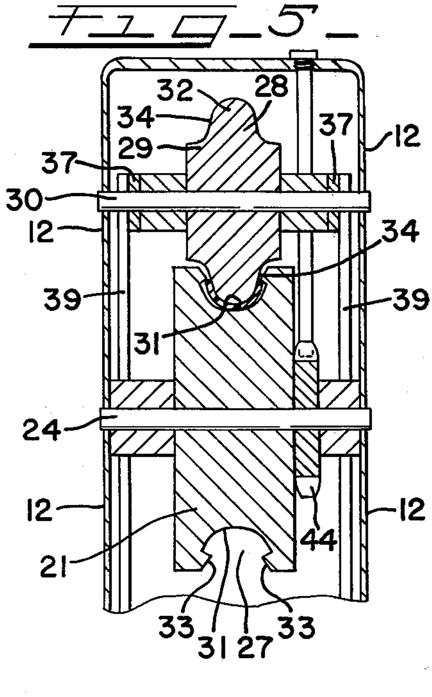
FIG. 5 is a cross sectional view taken generally along the lines 5—5 of FIG. 1.

As shown particularly in FIG. 5 the drive roll 21 is turnably journalled on a shaft pin 24 supported at each end in the side walls 12. A tape receiving groove 27 is formed on the periphery of the drive roll 21.

The tape receiving groove 27 receives a peripheral rib 28 of a driven roller 29 which is journalled on a pin 30 supported at its ends on the side walls 12—12. The tape receiving groove 27 and the rib 28 are formed so that the tape is formed into a substantially semi-circular configuration to impart a degree of rigidity to the Tape T. The base 31 of the concave groove is substantially semi-circular to accommodate the semi-circular end 32 of the rib 28. At the outer ends of the semi-circular base, the walls of the groove are flared outwardly and then inwardly to form ridges 33 which engage the side walls 34 of the rib 28. The side walls 34 are generally tangential to the semi-circular end 32. With this configuration of the rib 28 and receiving groove 27 the tape is curled so that it exits above the supporting ledge in a more or less rigid state and thereby prevents jamming and clogging during application of the tape and punching as more fully to be explained hereinafter.

The punching and tape applying mechanism includes a punch 36 fixed to one end of a pair of levers 37 which are pivotally mounted intermediate their ends on the pin 30. Lever arms 39 are pivotally connected by means of a pin 41 to the other end of the levers 37. The lever arms 39 extend upwardly from an actuating grip 42 pivotally supported between walls 12 on pin 40. The grip 42 is normally biased to the non-operating position as shown in FIG. 1 by means of a leaf biasing spring 35.

Figure 3:
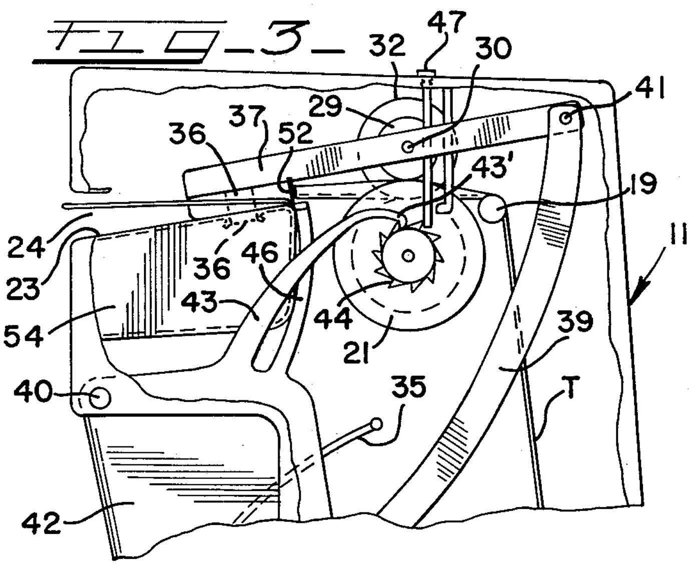
FIG. 3 is a fragmentary and enlarged elevational view of the operating mechanism with the punch and applicator shown in the operative punching and reinforcing positions.
Figure 8:
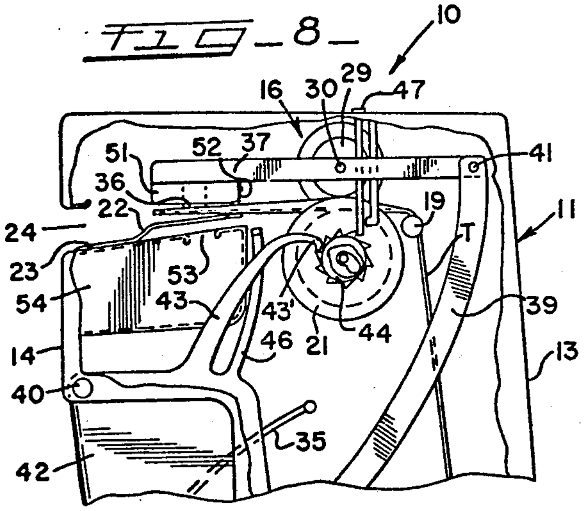
FIG. 8 is a fragmentary elevational view similar to FIGS. 3 and 4 but showing the tape guide structure.
Figure 6:
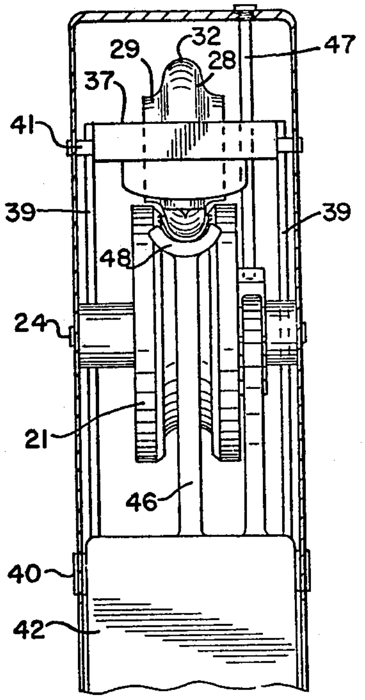
FIG. 6 is a cross sectional view taken generally along the lines 6—6 of FIG. 1.
Figure 4:
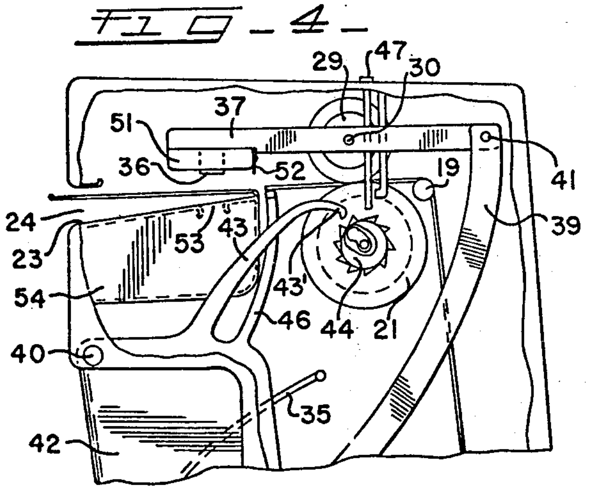
FIG. 4 is a fragmentary enlarged view of the operating mechanism shown in FIG. 3 but with the drive roller located so that the mechanism operates solely as a punch.
Figure 7:
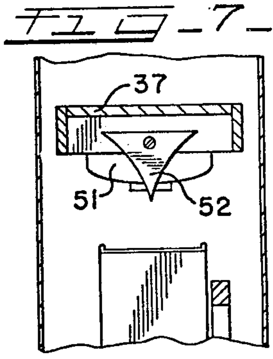
FIG. 7 is a cross sectional view of the punch and tape depresser taken generally along the lines 7—7 of FIG. 1.

A tape feed lever 43 also extends from the grip 42 in the form of a pawl 43'. The pawl 43' engages a ratchet 44 fixed to the face of the drive roll 21. In order to de-activate the ratchet so that the tape drive is disengaged and the assembly may be used solely as a punch, the side walls 12 are slotted as shown so that the supporting shaft 30 may be raised and lowered as shown in FIGS. 8 and 4, respectively. When in the lowered position a support arm 46 is operative to support the tape T above the drive roll 21 as shown in FIG. 4, so that The tape T is not fed over the support 23. The device is thus able to serve as a paper punch only as more fully to be explained hereinafter, Associated with the ratchet in the tape feed position as shown in FIGS. 1, 3 and 8, is a stop pin 47 which serves to prevent clockwise movement as viewed in the aforementioned figures. The stop pin 47 is free to move vertically during counterclockwise rotating or tape feeding movement of the ratchet 44 when actuated by the hand grip 41. To accommodate the curled tape in the support arm 46 the upper end thereof is formed with a cradle 48. This not only supports the tape but also creates tension from end of tape to this support arm and provide a surface to efficiently pierce and slit tape from continuous roll.

Surrounding the punch 36 is a tape applicator cushion or pad 51 made of a resilient material such as rubber, polyurethane, or the like. The pad 51 is suitably fixed to the arm 37. A severing blade 52 is attached to the arm 37 and is operative to sever the tape T after a hole has been punched in the tape and the underlying paper to which it is to be attached. The support plate 23 is provided with a punch receiving opening 53 which communicates with a compartment 54 into which the punch material of the paper and tape is discharged. The compartment 54 may be provided with a suitable access opening for emptying the scrap punched material.

The cutting blade 52 is triangular in shape with one angle extending downwardly into a sharp point and with the sides of the angle extending arcuately upward to the other two angles of the triangle. These arcuate sides are cutting edges too so that when the arms 37 are actuated to punch a hole in the paper, the point of the blade pierces the tape and as it goes down the arcuate sides cut off the end of the tape which has been simultaneously pressed onto the surface of the paper.

In operation a roll of the pressure sensitive tape is placed on the spindle 18 and trained over the drive roller 24 when the latter is in the lowered position as shown in FIG. 4. Thereafter, the drive wheel 24 is rotated so that the slot is disposed on the shaft 30 in the operative tape feeding position. In this position the roller 24 with the rib 19 thereon is operative to curl the tape so that it resists flexing. In this connection it is to be noted that as shown in FIG. 5 the tape is contacted along the arcuate base of the groove 31 and also at spaced lines at the ridges 33. This contact arrangement imparts the curl into the tape and at the same time permits effective feeding. The curled tape T is trained over the cradle 48 of the support arm 46 and over the support table 23.

The hand or pistol grip is then depressed whereupon the pad 51 is operative to press the pressure sensitive face of the tape T firmly against an underlying sheet of paper. At the same time the blade 52 severs the tape T, and the punch 36 punches a hole in the tape and paper. The punched tape and paper material drops through the opening 53.

When the pistol grip is depressed to actuate the punch 36, the pawl 43 rides clockwise on the ratchet teeth which is held stationary by the stop pin 47 as viewed in the position shown. Upon release of the grip, the leaf spring 35 returns the hand grip to its original position. This causes the pawl 43 to rotate the ratchet counterclockwise so that the tape is fed into position for application to an underlying paper as described above.

In FIG. 8 is shown a modified form of feed for the tape T into the machine. In this instance the tape roll is reversed on its pintle support 18 so that the sticky side of the tape faces upward as it advances between the drive roller 21 and the driven roller 29 so that it emerges therefrom under the paper. When the grip is then depressed the pad 51 presses the paper against upwardly facing tape while the punch 36 is punching a hole through the paper and tape, and the blade 52 is severing that portion of the tape engaging the paper.

Figure 9:
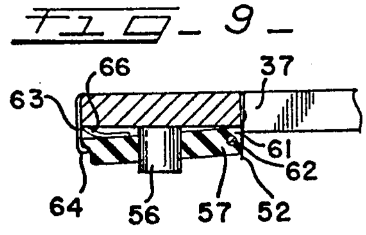
FIG. 9 is a modified pad support.

A modified pad assembly is shown in FIG. 9 wherein a recess 61 is formed in the arm. The pad 51 is pivotally supported at one end by a pin 62. The other end is supported for sliding movement by a flange 63 having a lip 64. The pad 51 is normally biased into engagement with the flange 63 by means of a curled leaf spring 66 as shown. This arrangement allows point contact of the tip of the pad 51 with tape T thereby securing the leading end of said tape onto the paper slightly before the hole punching and the tape slitting operation.

What is claimed is:

1. A combination paper hole punch and reinforcement tape applicator comprising a housing, a spindle for supporting a supply of tape, a drive roller supported for rotating movement, a concave peripheral groove in said drive roller for receiving a strip of tape from said supply, a driven roller having a peripheral rib depressing said tape into said groove so as to curl said tape across its width, a paper and tape support, a movable tape support arm, a pad assembly for applying said tape to said paper, means moving said tape support arm to create tension in said tape from the end thereof to the support arm, and punch means for punching a hole through said tape and said paper while under tension.

2. The invention as defined in claim 1 wherein said groove includes a substantially semi-circular base portion with a ridge overhang to guide and prevent the tape from climbing the sides of said roller when engaged with said driven roller.

3. The invention as defined in claim 1 wherein the end of the support arm is formed with a cradle which supports the tape and creates tension in the tape from the end thereof to the cradle, while simultaneously providing a cutting surface.

4. The invention as defined in claim 1 wherein said housing includes movable grip means having a pawl, drive means including a ratchet, said pawl being engageable with said ratchet and being operative after depression of said grip to feed said tape adjacent said paper and tape support.

5. The invention as defined in claim 4 wherein said ratchet is fixed to said drive roller and said drive roller is mounted on a supporting shaft so as to be disengaged from said pawl upon depression of said grip and thereby render said tape feed inoperative.

6. The invention as defined in claim 1 wherein said punch means extends through said pad whereby said pad is operative to press said tape to an adjacent sheet of paper while said tape and paper is being punched.

7. The invention as defined in claim 1 wherein a blade is attached to said pad and operative to sever said tape during the punching of the hole in said tape and paper.

8. The invention as defined in claim 1 wherein said blade cutting edge is V-shaped to pierce and slit said tape during the punching operation.

9. The invention as defined in claim 1 wherein said punch is operative to punch the tape and paper simultaneously and form a hole therein.

* * * * *